(12) United States Patent
Gaito et al.

(10) Patent No.: US 12,074,916 B2
(45) Date of Patent: Aug. 27, 2024

(54) METHODS, COMMUNICATION DEVICES AND SYSTEM RELATING TO PERFORMING LAWFUL INTERCEPTION

(71) Applicant: Telefonaktiebolaget LM Ericsson (publ), Stockholm (SE)

(72) Inventors: Daniele Gaito, Naples (IT); Gaetano Barba, Sant'Antonio Abate (IT); Raffaele Costabile, Torre del Greco (IT)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 1 day.

(21) Appl. No.: 18/026,200

(22) PCT Filed: Sep. 14, 2020

(86) PCT No.: PCT/SE2020/050856
§ 371 (c)(1),
(2) Date: Mar. 14, 2023

(87) PCT Pub. No.: WO2022/055403
PCT Pub. Date: Mar. 17, 2022

(65) Prior Publication Data
US 2023/0370501 A1    Nov. 16, 2023

(51) Int. Cl.
*H04L 9/40*    (2022.01)
(52) U.S. Cl.
CPC ................... *H04L 63/306* (2013.01)
(58) Field of Classification Search
CPC ...................................... H04L 64/306
See application file for complete search history.

(56) References Cited

U.S. PATENT DOCUMENTS 10,104,193 B2 * 10/2018 Li ..................... H04L 67/306
11,864,092 B2 * 1/2024 Yao .................... H04W 24/08
(Continued)

FOREIGN PATENT DOCUMENTS

| CN | 104935466 A | 9/2015 | |
| EP | 2427981 B1 | 6/2017 | |
| WO | WO-2018224862 A1 * | 12/2018 | ........... H04L 63/306 |

OTHER PUBLICATIONS

John Cartmell, "Meeting lawful interception requirements for selected IP traffic offload and local IP access traffic", IEEE International Conference on Technoloiges for HomelandSecuirty, Nov. 12, 2013, IEEE Publishing.*

(Continued)

*Primary Examiner* — Todd L Barker
(74) *Attorney, Agent, or Firm* — Murphy, Bilak & Homiller, PLLC

(57) ABSTRACT

A method (200) performed by a communication device hosting a network element, NE, the method comprising: —preparing (202) a Report Issue request message for reporting an Issue; —incrementing (204) an Issue count to obtain a current Issue count of Issues reported by the NE to a lawful interception, LI, administrative function, ADMF; —adding (206) the current Issue count to the Report Issue request message; —sending (208) the Report Issue request message (610) including the current Issue count to the LI ADMF; —receiving (210) a request message (620) from the LI ADMF requesting information about at least one Report Issue request message sent by the NE and not received by the LI ADMF; and —sending (212) a response message (622) including the requested information.

18 Claims, 10 Drawing Sheets

(56) References Cited

U.S. PATENT DOCUMENTS

| | | |
|---|---|---|
| 2002/0150096 A1 | 10/2002 | Sjöblom |
| 2004/0003007 A1 | 1/2004 | Prall et al. |
| 2004/0095894 A1* | 5/2004 | Eloranta ............... H04W 12/80 |
| | | 370/252 |
| 2006/0034198 A1 | 2/2006 | Makinen et al. |
| 2009/0019551 A1* | 1/2009 | Haga ....................... G06F 21/57 |
| | | 380/44 |
| 2011/0244916 A1* | 10/2011 | Attanasio ............. H04L 63/308 |
| | | 455/525 |
| 2015/0188751 A1 | 7/2015 | Vasseur et al. |
| 2020/0136983 A1* | 4/2020 | Ghanwani ............... H04L 43/04 |
| 2022/0182923 A1* | 6/2022 | Yao ......................... H04W 4/14 |

OTHER PUBLICATIONS

Sharevski, F. "Towards 5G Cellular network forensics", EURASIP Journal on Information Security, Jul. 11, 2018.*
"ETSI GR NFV-SEC 011 V1.1.1", Network Functions Virtualization (NFV); Security; Report on NFV LI Architecture, Apr. 2018, 1-49.
"ETSI TS 102 232-1 V3.21.1", Lawful Interception (LI); Handover Interface and Service-Specific Details (SSD) for IP delivery; Part 1: Handover specification for IP delivery, Dec. 2019, 1-74.
"ETSI TS 103 221-1 V1.3.1", Lawful Interception (LI); Part 1: Internal Network Interface X1 for Lawful Interception, Sep. 2018, 1-37.
"ETSI TS 103 221-1 V1.6.1", Lawful Interception (LI); Internal Network Interfaces; Part 1: X1, Dec. 2019, 1-44.
"ETSI TS 103 221-1 V1.7.1", Lawful Interception (LI); Internal Network Interfaces; Part 1: X1, Aug. 2020, 1-44.

* cited by examiner

METHODS, COMMUNICATION DEVICES AND SYSTEM RELATING TO PERFORMING LAWFUL INTERCEPTION

TECHNICAL FIELD

The invention relates to a method performed by a communication device hosting a Network Element, a method performed by a communication device comprising a Lawful Interception Administration Function, a method of Issue reporting during lawful interception in a telecommunication network, communication devices, a lawful interception system implemented in a communication network, a corresponding computer program and a data carrier.

BACKGROUND

FIG. 1 shows an exemplary Lawful Interception, LI, network and system according to document ETSI GR NFV-SEC 011 V1.1.1. FIG. 1 shows a high-level architecture for lawful interception in a virtualized environment. Entities are logically represented, therefore it does not necessary reflect separate physical entities. Entities will be described herein for a non-virtualized environment and for a virtualized environment.

The exemplary LI system comprises a Law Enforcement Agency, LEA, network and a Communications Service Provider, CSP, network. LEA 101 is an organization authorized by a lawful authorization based on the applicable jurisdiction to request and receive the results of telecommunications interceptions of an interception target. The target is a person of interest and/or user equipment possessed or used by the person of interest being surveyed by the LEA 101. Said LEA 101 communicates with the CSP network through a network interface, called Handover Interface, HI. LEA 101 comprises a Warrant Issuing Authority/Warrant Issuing Authority device 102 and a Law Enforcement Monitoring Facility, LEMF 103. The Warrant Issuing Authority 102 issues an intercept request, e.g. lawful authorization or warrant to the CSP through a first Handover Interface, HI1. The LEMF 103 collects the intercepted information of the interception target. The LEMF 103 communicates with an LI site 104 through a second Handover Interface, HI2, for receiving Intercept Related Information, IRI, and through a third Handover Interface, HI3, for receiving Content of Communication, CC. Interfaces HI1, HI2, and 30 HI3 are specified in more detail in the ETSI TS 102 232-1 V3.21.1 standard, "Lawful Interception (LI); Part 1: Internal Network Interface X1 for Lawful Interception".

Entities within the CSP network communicate through internal network interfaces.

The LI site 104 comprises an LI Administration Function, ADMF, 105 and a Mediation and Delivery Function, MF/DF, 106. The LI ADMF 105 communicates with the MF/DF 106 through an X1_2 interface and an X1_3 interface. The LI ADMF 105 generate, based on said received intercept request, a warrant comprising one or more interception target identities, and send the warrant to a Point Of Interception, POI, 107, within an NE 108 via an interface denoted by X1_1; the NE 108 is an entity that performs the interception. Said POI 107 detects the interception target communication, derives the IRI or CC from the target communications, and delivers the POI Output to the MD/MF 106. POIs are divided into two types based on the type of data they send to the MF/DF 106: IRI-POI delivers Intercept Related Information to the MF through an X2 interface and CC-POI delivers CC to the MF through an X3 interface. IRI are collection of information or data associated with telecommunications services involving the interception target identity, specifically call associated information or data (e.g. unsuccessful call attempts), service associated information or data (e.g. service profile management by subscriber) and location information. The CC is information exchanged between two or more users of a telecommunications service, excluding IRI. The MF receives IRI and CC and transforms them from internal interface format to Handover Interface format. The DF will then handle dispatching of said data to the one or more designated LEAs 101.

In a Network Functions Virtualization, NFV, environment, MF/DF 106 and POI 107 may be embedded within a Network Function, NF. In this scenario, an X1_DC interface is used by a virtualized POI, vPOI and virtualized MF/DF, vMF/vDF to inform each other of changes (e.g. scaling or mobility) in the virtualized environment. An NFV Management and Orchestration function, MANO, and/or a Security Orchestrator, SO, 109 handle the management and orchestration of all resources in a virtualized data center including computing, networking, storage, and virtual machine, VM, resources. An LI controller is responsible for creating, modifying, deleting, and auditing vPOI and vMF/vDF configuration during their lifecycle. The LI controller has two sub-functions: LI controller at network service application level, called LI App Controller 110, and LI controller at NFV level, called LI NFV controller 111. LI App Controller 110 and LI ADMF 105 communicate through an LI-Os-0 interface; LI App controller 110 and vPOI 107 communicate through an X0_1 interface; LI App controller 110 and vMF/vDF 106 communicate through an X0_2 interface. The LI NFV controller 111 is managed by the LI App controller 110 via an LI-OS-1 interface. X1_DC, X0_1, X0_2, LI-OS-0 and LI-OS-1 interfaces are specified in more detail in ETSI GR NFV-SEC 011 V1.1.1.

A Lawful Interception Routing Proxy Gateway, LRPG, 112 can be used to provide a Handover Interface proxy function to isolate the LEMF 103 and prevent the LEMF 103 to be visible to MANO 109. This function is optional.

FIG. 2 is a block diagram of an exemplary LI network and system according to document ETSI TS 103 221-1 V1.7.1. The exemplary LI system comprises a number of communication devices, which host an NE, 108 connected to the LI ADMF 105 through the X1 interface.

According to the ETSI TS 103 221-1 standard, a command is sent from an LI ADMF to an NE as a "task", such as "activate", "modify" and "deactivate" on the X1 interface using a message structure defined in the standard, and the NE responds to the LI ADMF with a response message. The NE is manually provided (at installation and during network maintenance) with a specific destination for reporting issues to the LI ADMF. Issues can be reported using, for example ReportTaskIssue, ReportDestinationIssue or ReportNEIssue requests sent by the NE to the LI ADMF on the X1 interface as a spontaneous notification. In case of any issue (warning or fault) on Task, NE or Destination, the NE informs the LI ADMF with a related ReportxxxIssue request.

SUMMARY

It is an object to enable a more reliable LI system, e.g. through improved certainty in messaging between a network element, NE, and a lawful interception, LI, administrative function, ADMF.

A first aspect provides a method performed by a communication device hosting a network element, NE. The method comprises preparing a Report Issue request message for reporting an Issue and incrementing an Issue count to obtain a current Issue count of Issues reported by the NE to a lawful interception, LI, administrative function, ADMF. The current Issue count is added to the Report Issue request message and the Report Issue request message including the current Issue count is sent to the LI ADMF. The method further comprises receiving a request message from the LI ADMF requesting information about at least one Report Issue request message sent by the NE and not received by the LI ADMF and sending a response message including the requested information.

Currently, in the case of a network problem an LI ADMF may not receive one or more ReportIssue requests sent by an NE and when the connection between the NE and the LI ADMF is reestablished, the LI ADMF is not aware that some ReportIssue requests have not been received and so it cannot take any action to recover from this situation. Also, in the case of a misconfiguration between an NE and an LI ADMF ReportIssue requests sent by the NE will be not received by the LI ADMF. The method advantageously enables a way for an LI ADMF to understand whether one or more Report Issue request messages, such as ReportIssue requests in the ETSI TS 103 221-1 standard, sent to it by an NE have not been received. The method also enables the NE to resend the information sent in the Report Issue request message that was not received by the LI ADMF. The LI ADMF may therefore be maintained aligned in real time with the NE as regards ReportIssue messages. The method may advantageously mitigate overload of the network because the NE will only resend information about Report Issue requests not received by the LI ADMF when really needed, removing the need for a periodic mechanism for realigning the LI ADMF with the NE as regards Report Issue requests.

In an embodiment, the current Issue count also forms an identifier of the Issue. This advantageously enables Issues to be identified and resent to the LI ADMF when requested.

In an embodiment, the Report Issue request message includes a CounterIssue field and the current Issue count is added in the CounterIssue field.

In an embodiment, the Report Issue request message is one of a ReportTaskIssueRequest, ReportNEIssueRequest or a ReportDestinationIssueRequest. Incrementing an Issue count comprises incrementing a respective one of a TaskIssue count, an NEIssue count or a DestinationIssue count. Adding the current Issue count comprises adding a respective one of a current TaskIssue count, a current NEIssue count or a current DestinationIssue count to the respective CounterIssue field. The method may advantageously be applied to each of the types of ReportxxIssueRequest message specified in the ETSI TS 103 221-1 standard.

In an embodiment, the method further comprises receiving from the LI ADMF one of a Ping request or a Keep Alive request and sending a respective one of a Ping response or a Keep Alive response to the LI ADMF. The respective Ping response or Keep Alive response including information indicative of a current Issue count of Issues reported by the NE to the LI ADMF. Including the current Issue in Ping responses or Keep Alive responses may enable the LI ADMF to be aligned in real time with NE as regards ReportIssue requests and so any recovery action can be put in place immediately or just after few seconds.

In an embodiment, the respective one of a Ping response or a Keep Alive response includes at least one CounterIssue field and the information indicative of a current Issue count is added in the at least one CounterIssue field.

In an embodiment, the respective one of a Ping response or a Keep Alive response includes a CounterTaskIssue field, a CounterNEIssue field and a CounterDestinationIssue field and a current TaskIssue count, a current NEIssue count and a current DestinationIssue count are added in the respective said field.

In an embodiment, the request message is a GetAllDetails request and the response message is a GetAllDetails response. The method thus enables the GetAllDetails messages already present in the ETSI TS 103 221-1 standard to be used to cause the NE to resend the information sent in the Report Issue request message that was not received by the LI ADMF. The method may advantageously mitigate overload of the network because the NE will only send a GetAllDetails response when really needed, removing the need for a periodic mechanism for realigning the LI ADMF with the NE as regards Report Issue requests.

In an embodiment, the request message includes at least one identifier identifying the at least one Issue reported in the at least one Report Issue message for which information is requested. The response message includes information about the at least one Issue identified by the at least one identifier.

The method advantageously enables the information sent in the one or more Report Issue request messages that were not received by the LI ADMF to be requested and sent, thus reducing the use of GetAllDetails requests and GetAllDetails responses, the creation and handling of which can be computationally expensive. This method may advantageously mitigate overload of the network because a GetAllDetails message will be requested only when really needed. The method may advantageously mitigate overload of the network because the NE will only send a response message when really needed, removing the need for a periodic mechanism for realigning the LI ADMF with the NE as regards Report Issue requests.

Corresponding embodiments and advantages apply also to the method of Issue reporting during lawful interception in a telecommunication network, the communication device of the sixth aspect and the lawful interception system described below.

A second aspect provides a method performed by a communication device hosting a lawful interception, LI, administrative function, ADMF. The method comprises receiving a message from a network element, NE, and obtaining from the message a current Issue count of Issues reported from the NE to the LI ADMF. The current Issue count of Issues reported from the NE to the LI ADMF is compared with a current Issue count of Issues received at the LI ADMF from the NE. The method further comprises determining based on the comparing that there is at least one Report Issue request message sent by the NE and not received by the LI ADMF. A request message is sent to the NE requesting information about at least one Issue reported in the at least one Report Issue request message. A response message is received from the NE including the information about the at least one Issue reported in the at least one Report Issue request message. The current Issue count of Issues received at the LI ADMF from the NE is incremented based on the information in the response message.

Currently, in the case of a network problem an LI ADMF may not receive one or more ReportIssue requests sent by an NE and when the connection between the NE and the LI ADMF is reestablished, the LI ADMF is not aware that some ReportIssue requests have not been received and so it cannot take any action to recover from this situation. Also, in the case of a misconfiguration between an NE and an LI ADMF ReportIssue requests sent by the NE will be not received by the LI ADMF. The present method advantageously enables a way for an LI ADMF to understand whether one or more Report Issue request messages, such as ReportIssue requests in the ETSI TS 103 221-1 standard, sent to it by an NE have not been received. The method also enables the LI ADMF to obtain the information sent in the Report Issue request message that was not received.

In an embodiment, the current Issue count also forms an identifier of the Issue. This advantageously enables Issues to be identified and requested from the NE by the LI ADMF.

In an embodiment, the message received from the NE is a Report Issue request including a CounterIssue field containing the current Issue count.

In an embodiment, the Report Issue request is one of a ReportTaskIssueRequest, ReportNEIssueRequest or a ReportDestinationIssueRequest. The respective CounterIssue field includes a respective one of a current TaskIssue count, a current NEIssue count or a current DestinationIssue count. The method may advantageously be applied to each of the types of ReportxxIssueRequest message specified in the ETSI TS 103 221-1 standard.

In an embodiment, the method further comprises sending one of a Ping request or a Keep Alive request to the NE and the message received from the NE is a respective one of a Ping response or a Keep Alive response. The respective Ping response or Keep Alive response including information indicative of a current Issue count of Issues reported by the NE to the LI ADMF. Receiving the current Issue in Ping responses or Keep Alive responses may enable the LI ADMF to be aligned in real time with NE as regards ReportIssue requests and so any recovery action by the LI ADMF can be put in place immediately or just after few seconds.

In an embodiment, the respective one of a Ping response or a Keep Alive response includes at least one CounterIssue field including the information indicative of a current Issue count of Issues reported by the NE to the LI ADMF.

In an embodiment, the respective one of a Ping response or a Keep Alive response includes a CounterTaskIssue field including a current TaskIssue count, a CounterNEIssue field including a current NEIssue count and a CounterDestinationIssue field including a current DestinationIssue count.

In an embodiment, the request message is a GetAllDetails request and the response message is a GetAllDetails response. The method thus enables the GetAllDetails messages already present in the ETSI TS 103 221-1 standard to be used to request the NE to resend the information sent in the Report Issue request message that was not received by the LI ADMF. The method may advantageously mitigate overload of the network because the LI ADMF will only send a GetAllDetails request, and the NE will only send a GetAllDetails response, when really needed, removing the need for a periodic mechanism for realigning the LI ADMF with the NE as regards Report Issue requests.

In an embodiment, the request message includes at least one identifier identifying the at least one Issue reported in the at least one Report Issue message for which information is requested. The response message includes information about the at least one Issue identified by the at least one identifier.

The method advantageously enables the information sent in the one or more Report Issue request messages that were not received by the LI ADMF to be requested and received, thus reducing the use of GetAllDetails requests and GetAllDetails responses, the creation and handling of which can be computationally expensive. This method may advantageously mitigate overload of the network because a GetAllDetails message will be send only when a GetAllDetails response is really needed. The method may advantageously mitigate overload of the network because the NE will only send a response message when really needed, removing the need for a periodic mechanism for realigning the LI ADMF with the NE as regards Report Issue requests.

Corresponding embodiments and advantages apply also to the method of Issue reporting during lawful interception in a telecommunication network, the communication device of the seventh aspect and the lawful interception system described below.

A third aspect provides a method of Issue reporting during lawful interception in a telecommunication network. The method comprises the following at a communication device hosting a network element, NE. A Report Issue request message for reporting an Issue is prepared and an Issue count is incremented to obtain a current Issue count of Issues reported by the NE to a lawful interception, LI, administrative function, ADMF. The current Issue count is added to the Report Issue request message and the Report Issue request message including the current Issue count is sent to the LI ADMF. The method further comprises receiving a request message from the LI ADMF requesting information about at least one Report Issue request message sent by the NE and not received by the LI ADMF and sending a response message including the requested information. The method further comprises the following at a communication device hosting a lawful interception, LI, administrative function, ADMF. A message is received from a network element, NE, and a current Issue count of Issues reported from the NE to the LI ADMF is obtained from the message. The current Issue count of Issues reported from the NE to the LI ADMF is compared with a current Issue count of Issues received at the LI ADMF from the NE. The method further comprises determining based on the comparing that there is at least one Report Issue request message sent by the NE and not received by the LI ADMF. A request message is sent to the NE requesting information about at least one Issue reported in the at least one Report Issue request message. A response message is received from the NE including the information about the at least one Issue reported in the at least one Report Issue request message. The current Issue count of Issues received at the LI ADMF from the NE is incremented based on the information in the response message.

A fourth aspect provides a computer program comprising instructions which, when executed on a communication device, cause the communication device to carry out any of the above steps of any of the methods according to any of the first, second and third aspects.

A fifth aspect provides a data carrier having computer readable instructions embodied therein, the computer readable instructions for providing access to resources available on a communication device and the computer readable instructions comprising instructions to cause the communication device to perform the steps of any of the above steps of the methods according to any of the first, second and third aspects.

In an embodiment, the carrier is one of an electronic signal, optical signal, radio signal, or computer readable storage medium.

A sixth aspect provides a communication device comprising interface circuitry, at least one processor and memory. The memory comprises instructions which when performed by the at least one processor cause the communication device to perform the following network element, NE, operations. An operation of preparing a Report Issue request message for reporting an Issue. An operation of incrementing an Issue count to obtain a current Issue count of Issues reported by the NE to a lawful interception, LI, administrative function, ADMF. An operation of adding the current Issue count to the Report Issue request message. An operation of sending the Report Issue request message including the current Issue count to the LI ADMF. An operation of receiving a request message from the ADMF requesting information about at least one Report Issue request message sent by the NE and not received by the LI ADMF. An operation of sending a response message including the requested information.

A seventh aspect provides a communication device comprising interface circuitry, at least one processor and memory. The memory comprises instructions which when performed by the at least one processor cause the second communication device to perform the following lawful interception, LI, administrative function, ADMF, operations. An operation of receiving a message from the network element, NE. An operation of obtaining from the message a current Issue count of Issues reported from the NE to the LI ADMF. An operation of comparing the current Issue count of Issues reported from the NE to the LI ADMF with a current Issue count of Issues received at the LI ADMF from the NE. An operation of determining based on the comparing that there is at least one Report Issue request message sent by the NE and not received by the LI ADMF. An operation of sending a request message to the NE requesting information about at least one Issue reported in the at least one Report Issue request message. An operation of receiving from the NE a response message including the information about the at least one Issue reported in the at least one Report Issue request message. An operation of incrementing the current Issue count of Issues received at the LI ADMF from the NE based on the information in the response message.

An eighth aspect provides a lawful interception system in a telecommunication network, the system comprising a first communication device and a second communication device. The first communication device comprises interface circuitry, at least one processor and memory. The memory comprises instructions which when performed by the at least one processor cause the communication device to perform the following network element, NE, operations. An operation of preparing a Report Issue request message for reporting an Issue. An operation of incrementing an Issue count to obtain a current Issue count of Issues reported by the NE to a lawful interception, LI, administrative function, ADMF. An operation of adding the current Issue count to the Report Issue request message. An operation of sending the Report Issue request message including the current Issue count to the LI ADMF. An operation of receiving a request message from the ADMF requesting information about at least one Report Issue request message sent by the NE and not received by the LI ADMF. An operation of sending a response message including the requested information. The second communication device comprises interface circuitry, at least one processor and memory. The memory comprises instructions which when performed by the at least one processor cause the second communication device 30 to perform the following lawful interception, LI, administrative function, ADMF, operations. An operation of receiving a message from the network element, NE. An operation of obtaining from the message a current Issue count of Issues reported from the NE to the LI ADMF. An operation of comparing the current Issue count of Issues reported from the NE to the LI ADMF with a current Issue count of Issues received at the LI ADMF from the NE. An operation of determining based on the comparing that there is at least one Report Issue request message sent by the NE and not received by the LI ADMF. An operation of sending a request message to the NE requesting information about at least one Issue reported in the at least one Report Issue request message. An operation of receiving from the NE a response message including the information about the at least one Issue reported in the at least one Report Issue request message. An operation of incrementing the current Issue count of Issues received at the LI ADMF from the NE based on the information in the response message.

Embodiments of the invention will now be described, by way of example only, with reference to the accompanying drawings.

DETAILED DESCRIPTION

The same reference numbers will used for corresponding features in different embodiments.

Figure 1:
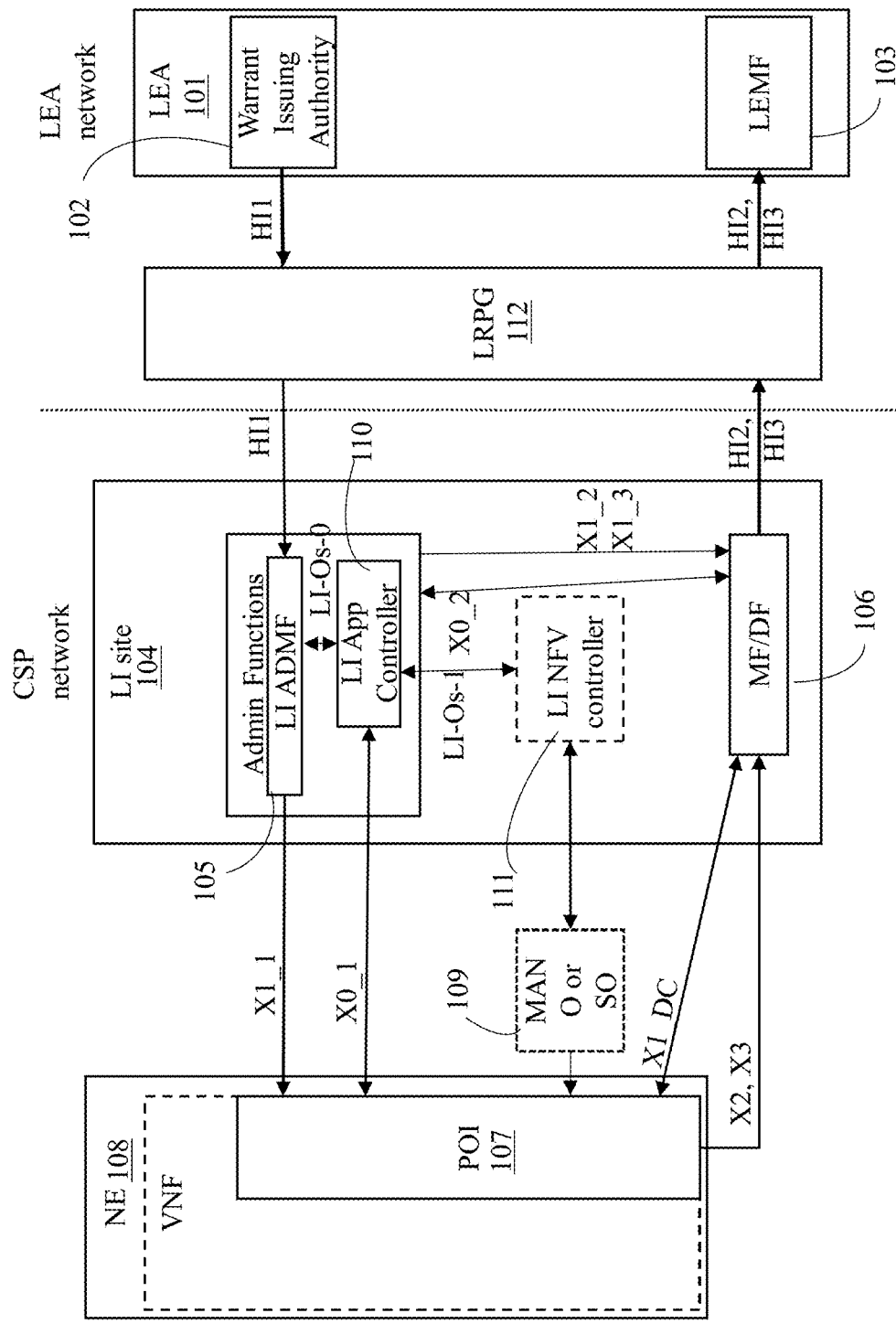
FIG. 1 is a block diagram of an exemplary LI network and system according to prior art.
Figure 2:
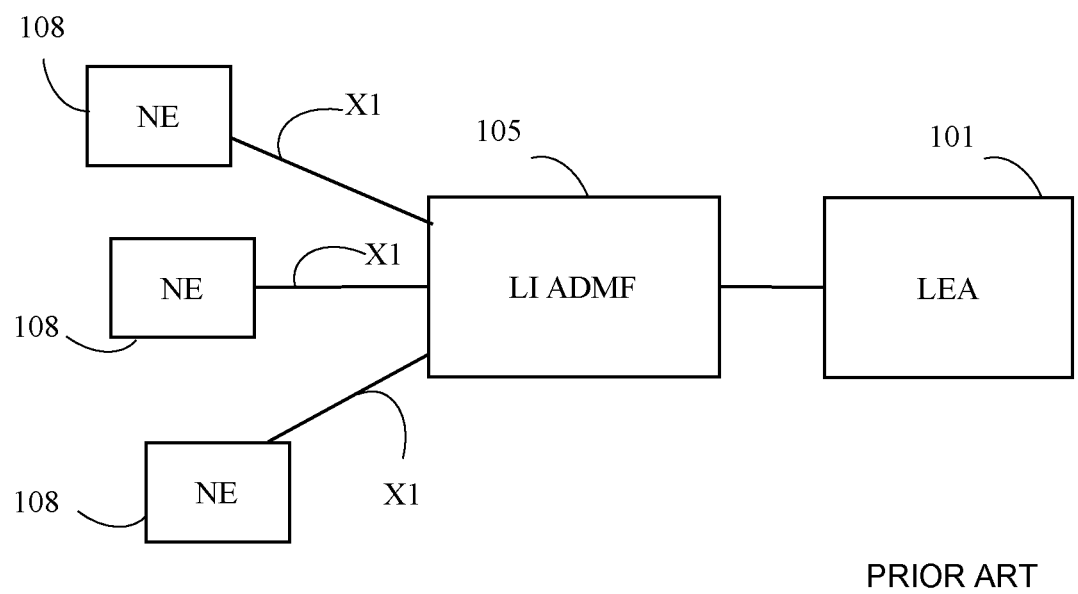
FIG. 2 is a block diagram of an exemplary LI network and system according to prior art.
Figure 3:
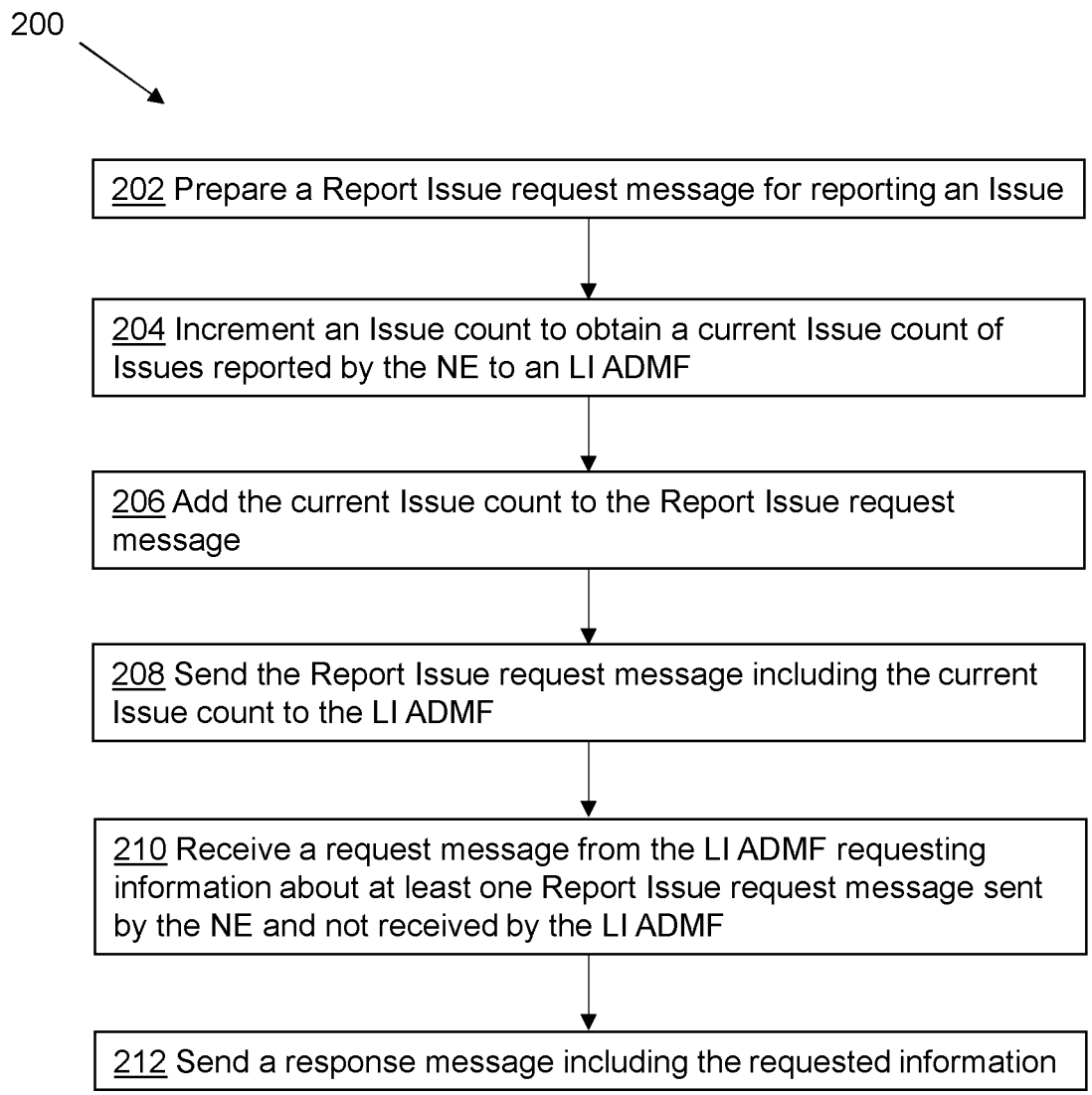
FIG. 3 is a flowchart illustrating a method performed by a communication device according to embodiments.

An embodiment provides a method 200 performed by a communication device hosting a network element, NE. The steps of the method 200 are illustrated in FIG. 3 and comprise:
- preparing 202 a Report Issue request message for reporting an Issue;
- incrementing 204 an Issue count to obtain a current Issue count of Issues reported by the NE to a lawful interception, LI, administrative function, ADMF;
- adding 206 the current Issue count to the Report Issue request message;
- sending 208 the Report Issue request message including the current Issue count to the LI ADMF;
- receiving 210 a request message from the LI ADMF requesting information about at least one Report Issue request message sent by the NE and not received by the LI ADMF; and
- sending 212 a response message including the requested information.

In an embodiment, the current Issue count also forms an identifier of the Issue.

In an embodiment, the Report Issue request message includes a CounterIssue field and the current Issue count is added in the CounterIssue field.

In an embodiment, the Report Issue request message is one of a ReportTaskIssueRequest, ReportNEIssueRequest or a ReportDestinationIssueRequest, each having a CounterIssue field. For example, the ReportTaskIssueRequest, ReportNEIssueRequest and ReportDestinationIssueRequest message formats defined in Tables 34, 36 and 38 of the ETSI TS 103 221-1 standard for the LI X1 interface may be modified to include CounterIssue fields, as illustrated in Tables 34A, 36A and 38A below:

TABLE 34A

Modified ReportTaskIssueRequest

| Field | Description | Format | M/C/O |
|---|---|---|---|
| XID | See clause 5.1 | See clause 5.1 | M |
| TaskReportType | Type of Issue | See clause 6.5.2.2 | M |
| TaskIssueErrorCode | Error code associated with the issue, if appropriate | See clause 6.7 | C |
| TaskIssueDetails | Further description of issue if appropriate | Free text | C |
| CounterIssue | Identifier of the reported Issue | Integer | O |

TABLE 36A

Modified ReportDestinationIssueRequest

| Field | Description | Format | M/C/O |
|---|---|---|---|
| DID | See clause 5.1 | See clause 5.1 | M |
| DestinationReportType | Type of Issue | Same as TaskReportType, see clause 6.5.2.2 | M |
| DestinationIssueErrorCode | Error code for the issue, if appropriate | See clause 6.7 | O |
| DestinationIssueDetails | Further description of issue if appropriate | Free text | O |
| CounterIssue | Identifier of the reported Issue | Integer | O |

TABLE 38A

Modified ReportNEIssueRequest

| Field | Description | Format | M/C/O |
|---|---|---|---|
| NEIssueDetails | Description of issue being reported, including type of message (Warning, Fault Cleared, Fault Report) and description | ErrorInformation structure (see clause 6.7) | M |
| CounterIssue | Identifier of the reported Issue | Integer | O |

In an embodiment, the step of incrementing an Issue count comprises incrementing a respective one of a TaskIssue count, an NEIssue count or a DestinationIssue count. Each of the ReportTaskIssueRequest, ReportNEIssueRequest or a ReportDestinationIssueRequest has a respective CounterIssue field and the current TaskIssue count, the current NEIssue count or the current DestinationIssue count is added to the respective CounterIssue field. The count of each type of Issue is thereby separately incremented and added to the respective Report Issue request message. In terms of the tables above, for example, a current TaskIssue count would be added to the CounterIssue field in the ReportTaskIssueRequest, a current NEIssue count would be added to the CounterIssue field of the ReportNEIssueRequest and a current DestinationIssue count would to the CounterIssue field in the be added ReportDestinationIssueRequest.

As described above, the current Issue count forms an Identified of the respective Issue, so the TaskIssue count added to CounterIssue field in the ReportTaskIssueRequest forms an Identifier of the reported TaskIssue, the DestinationIssue count added to CounterIssue field in ReportDestinationIssueRequest forms an Identifier of the reported DestinationIssue and the NEIssue count added to CounterIssue field in ReportNEIssueRequest forms an Identifier of the reported NEIssue.

Figure 4:
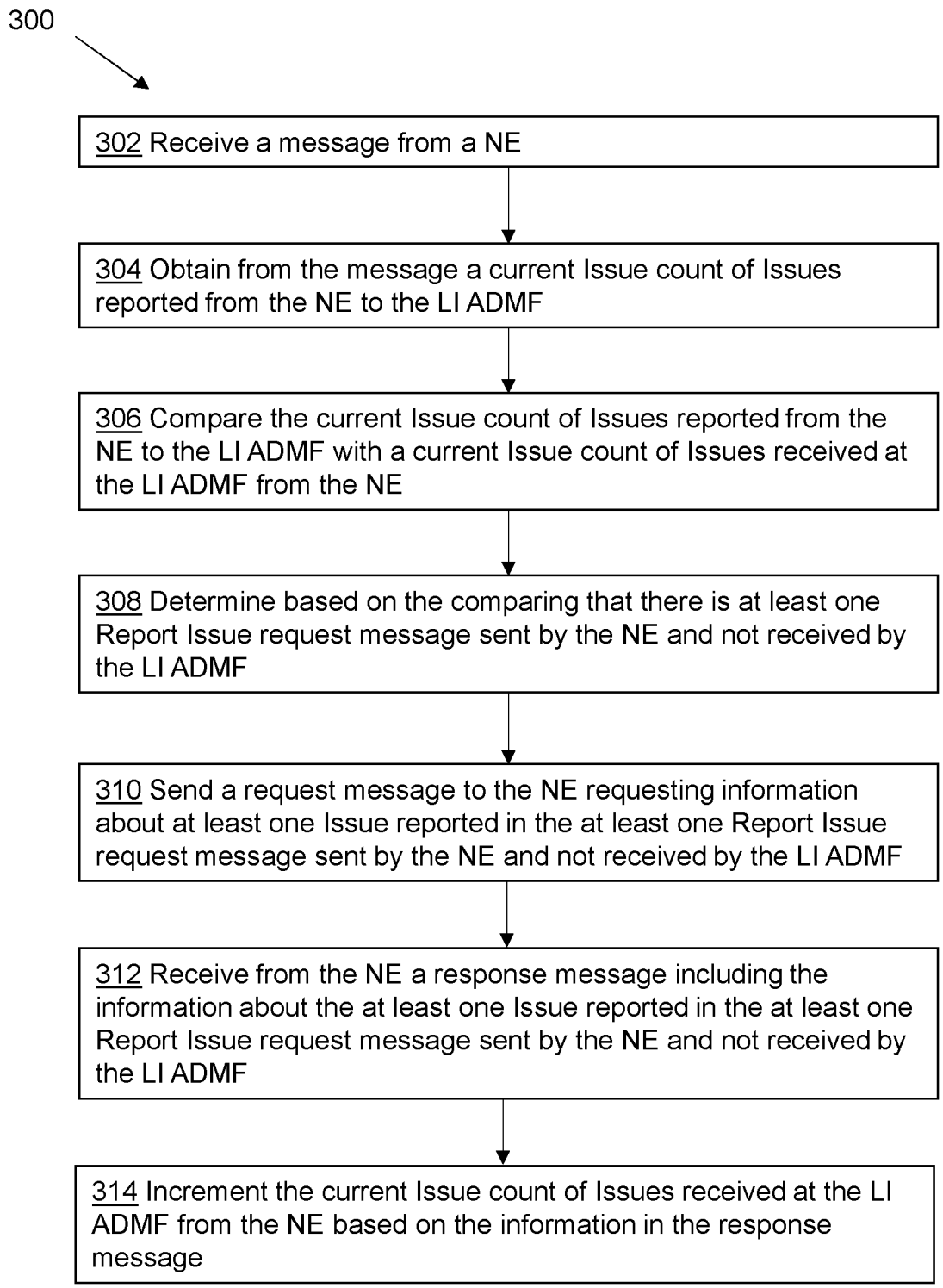
FIG. 4 is a flowchart illustrating a method performed by a communication device according to embodiments.

Corresponding embodiments relating to the Report Issue request apply to the method 300 performed by a communication device hosting an LI ADMF described below, with reference to FIG. 4.

In an embodiment, the method 200 further comprises receiving a Ping request or a Keep Alive request from the LI ADMF and sending a respective one of a Ping response or a Keep Alive response to the LI ADMF. The Ping response or Keep Alive response includes information indicative of a current Issue count of Issues reported by the NE to the LI ADMF.

In an embodiment, the Ping response or Keep Alive response includes a CounterIssue field and the information indicative of a current Issue count is added in the CounterIssue field.

For example, the PingResponse and KeepAliveResponse message formats defined in Tables 41 and 43 of the ETSI TS 103 221-1 standard for the LI X1 interface may be modified to include CounterIssue fields, as illustrated in Tables 41A and 43A below:

TABLE 41A

Modified PingResponse

| Field | Description | Format | M/C/O |
|---|---|---|---|
| OK or Error | The OK response has no other content. The general errors in clause 6.7 apply. | See clause 6.7 | M |
| CounterIssue | Counter of the Issues Reported by NE to ADMF | Integer | O |

TABLE 43A

Modified KeepAliveResponse

| Field | Description | Format | M/C/O |
|---|---|---|---|
| OK or Error | The OK response has no other content. The general errors in clause 6.7 apply. | See clause 6.7 | M |
| CounterIssue | Counter of the Issues Reported by NE to ADMF | Integer | O |

In an embodiment, the Ping response or Keep Alive response includes a CounterTaskIssue field, a CounterNEIssue field and a CounterDestinationIssue field and a current TaskIssue count, a current NEIssue count and a current DestinationIssue count are added in the respective field.

For example, the PingResponse and KeepAliveResponse message formats defined in Tables 41 and 43 of the ETSI TS 103 221-1 standard for the LI X1 interface may be modified to include three CounterIssue fields, one for each Issue type, as illustrated in Tables 41B and 43B below:

TABLE 41B

Modified PingResponse

| Field | Description | Format | M/C/O |
|---|---|---|---|
| OK or Error | The OK response has no other content. The general errors in clause 6.7 apply. | See clause 6.7 | M |

TABLE 41B-continued

Modified PingResponse

| Field | Description | Format | M/C/O |
|---|---|---|---|
| CounterTaskIssue | Counter of the TaskIssues Reported by NE to ADMF | Integer | O |
| CounterNEIssue | Counter of the NEIssues Reported by NE to ADMF | Integer | O |
| CounterDestinationIssue | Counter of the DestinationIssues Reported by NE to ADMF | Integer | O |

TABLE 43B

Modified KeepAliveResponse

| Field | Description | Format | M/C/O |
|---|---|---|---|
| OK or Error | The OK response has no other content. The general errors in clause 6.7 apply. | See clause 6.7 | M |
| CounterTaskIssue | Counter of the TaskIssues Reported by NE to ADMF | Integer | O |
| CounterNEIssue | Counter of the NEIssues Reported by NE to ADMF | Integer | O |
| CounterDestinationIssue | Counter of the DestinationIssues Reported by NE to ADMF | Integer | O |

In an embodiment, the request message received from the LI ADMF is a GetAllDetails request and the response message sent to the LI ADMF is a GetAllDetails response. The GetAllDetails request and the GetAllDetails response messages have the format defined in the ETSI TS 103 221-1 standard for the LI X1 interface.

In an embodiment, the request message received from the LI ADMG includes at least one identifier identifying the at least one Issue reported in the at least one Report Issue message for which information is requested. The response message includes information about the at least one Issue identified by the at least one identifier.

The request message may have the message format illustrated in Table 1, below, and may be referred to as a GetReportIssueRequest message:

TABLE 1

GetReportIssueRequest

| Field | Description | Format | M/C/O |
|---|---|---|---|
| ReportIssueIdentifiers | Identifier of the reported Issues requested. | String | O |

The ReportIssueIdentifiers filed contains at least one Identifier of at least one Issue reported in the at least one Report Issue message for which information is requested, i.e. that was not received by the LI ADMF. The ReportIssueIdentifiers field may contain a plurality of Identifiers as numbers and/or ranges separated by commas, for example: 1, 3, 5-12; the respective Identifier being the integer current IssueCount, as described above. The contents of the ReportIssueIdentifiers field may therefore be chosen to request a range of Identifiers, a list of Identifiers or a single Identifier; information about a range of Issues reported in a range of Report Issue messages not received by the LI ADMF may be requested, information about a plurality of Issues reported in a non-sequential plurality of Report Issue message not received by the LI ADMF, or information about a single Issue reported in a single Report issue message not received by the LI ADMF may thereby be requested.

The ReportIssueIdentifiers field may alternatively be left empty in which case information about all active issues is requested.

The response message may have the message format illustrated in Table 2, below, and may be referred to as a GetReportIssueResponse message:

TABLE 2

GetReportIssueResponse

| Field | Description | Format | M/C/O |
|---|---|---|---|
| ListOfReportTaskIssue | List of requested active Task Issue | List of Task issue structures | O |
| ListOfReportDestinationIssue | List of requested active Destination Issue | List of Destination issue structures | O |
| ListOfReportNEIssue | List of requested active NE Issue | List of NE issue structures | O |

The lists of Task issue structures, Destination issue structures and NE issue structures may be as described in Tables 34, 36 and 38 of the ETSI TS 103 221-1 standard.

An embodiment provides a method 300 performed by a communication device hosting a lawful interception, LI, administrative function, ADMF. The steps of the method 300 are illustrated in FIG. 4 and comprise:

receiving 302 a message from a network element, NE;

obtaining 304 from the message a current Issue count of Issues reported from the NE to the LI ADMF;

comparing 306 the current Issue count of Issues reported from the NE to the LI ADMF with a current Issue count of Issues received at the LI ADMF from the NE;

determining 308 based on the comparing that there is at least one Report Issue request message sent by the NE and not received by the LI ADMF;

sending 310 a request message to the NE requesting information about at least one Issue reported in the at least one Report Issue request message;

receiving 312 from the NE a response message including the information about the at least one Issue reported in the at least one Report Issue request message; and incrementing 314 the current Issue count of Issues received at the LI ADMF from the NE based on the information in the response message.

In an embodiment, the current Issue count also forms an identifier of the Issue.

In an embodiment, the message received from the NE is a Report Issue request including a CounterIssue field containing the current Issue count.

In an embodiment, the Report Issue request is one of a ReportTaskIssueRequest, ReportNEIssueRequest or a ReportDestinationIssueRequest and the respective CounterIssue field includes a respective one of a current TaskIssue count, a current NEIssue count or a current DestinationIssue count, as described above with reference to FIG. 3 and Tables 34A, 36A and 38A.

In an embodiment, the method 300 further comprises sending one of a Ping request or a Keep Alive request to the NE. The message received from the NE is a respective one of a Ping response or a Keep Alive response. The respective Ping response or Keep Alive response includes information indicative of a current Issue count of Issues reported by the NE to the LI 30) ADMF.

In an embodiment, the respective one of a Ping request or a Keep Alive request includes a CounterIssue field including the information indicative of a current Issue count of Issues reported by the NE to the LI ADMF, as described above with reference to FIG. 3 and Tables 41A and 43A.

In an embodiment, the Ping request or Keep Alive request includes a CounterTaskIssue field including a current TaskIssue count, a CounterNEIssue field including a current NEIssue count and a CounterDestinationIssue field including a current DestinationIssue count, as described above with reference to FIG. 3 and Tables 41B and 43B.

In an embodiment, the request message sent to the NE is a GetAllDetails request and the response message received from the NE is a GetAllDetails response. The GetAllDetails request and the GetAllDetails response messages have the format defined in the ETSI TS 103 221-1 standard for the LI X1 interface.

In an embodiment, the request message sent to the NE includes at least one identifier identifying the at least one Issue reported in the at least one Report Issue message for which information is requested. The response message includes information about the at least one Issue identified by the at least one identifier.

The request message may have the message format described above with reference to Table 1. The response message may have the message format described above with reference to Table 2.

Figure 13:
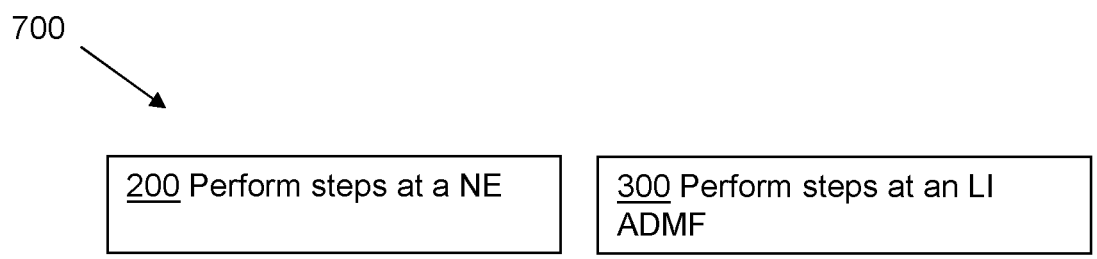
FIG. 13 is a block diagram illustrating a method according to an embodiment.

An embodiment provides a method 700 of Issue reporting during lawful interception in a telecommunication network, illustrated in FIG. 13. The method of this embodiment comprises the method 200 performed by a communication device hosting a NE, as described above with reference to FIG. 3 and Tables 1, 2, 34A, 36A, 38A, 41A, 41B, 43A and 43B, combined with the method 300 performed by a communication device hosting an LI ADMF, as described above with reference to FIG. 4 and Tables 1, 2, 34A, 36A, 38A, 41A, 41B, 43A and 43B.

Figure 5:
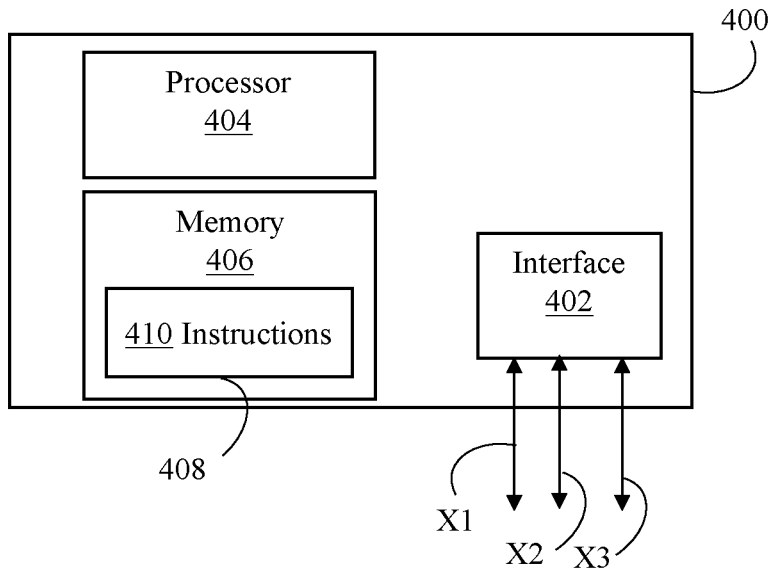
FIGS. 5 and 6 are block diagrams depicting communication devices according to embodiments.
Figure 7:
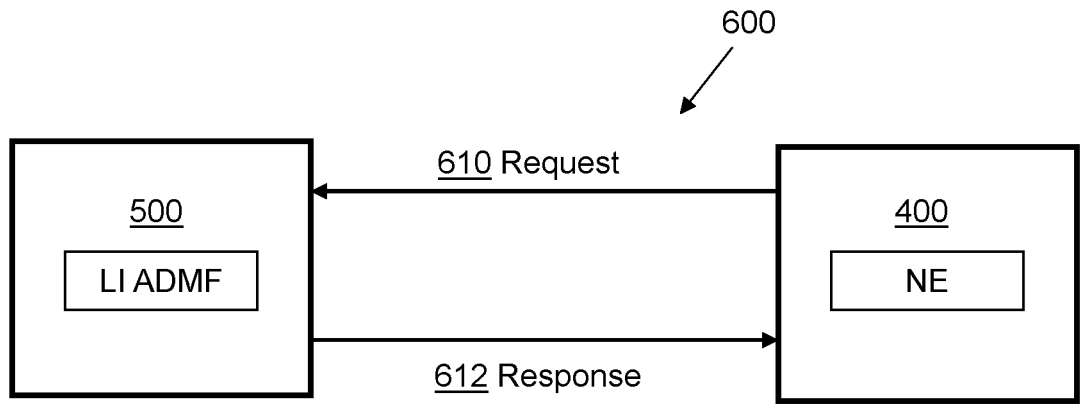
FIGS. 7 to 12 are signalling diagrams illustrating exchanges of messages in embodiments of the invention.
Figure 8:
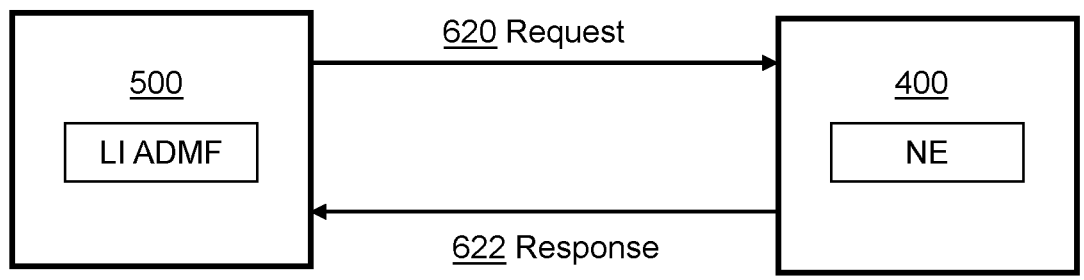

Referring to FIGS. 5, 7 and 8, an embodiment provides a communication device 400 comprising interface circuitry 402, a processor 404 and a data carrier 406 in the form of a memory. The interface circuitry is configured to receive requests and/or send responses between the communication device 400 and an LI ADMF (or a communication device 500 which hosts the LI ADMF).

The memory comprises instructions 408 which when performed by the at least one processor 404 cause the communication device to perform network element, NE, operations of:
preparing a Report Issue request message for reporting an Issue;
incrementing an Issue count to obtain a current Issue count of Issues reported by the NE to a lawful interception, LI, administrative function, ADMF;
adding the current Issue count to the Report Issue request message;
sending the Report Issue request message 610 including the current Issue count to the LI ADMF;
receiving a request message 620 from the ADMF requesting information about at least one Report Issue request message sent by the NE and not received by the LI ADMF; and
sending a response message 622 including the requested information.

In other words, the instructions may be a NE software hosted by the communication device 400, the NE software configured to perform one or more of the methods and embodiments described herein.

In an embodiment, the interface circuitry is configured to receive requests and/or send responses over an interface, X1, in accordance with the ETSI TS 103 221-1 standard for the LI X1 interface.

Figure 6:
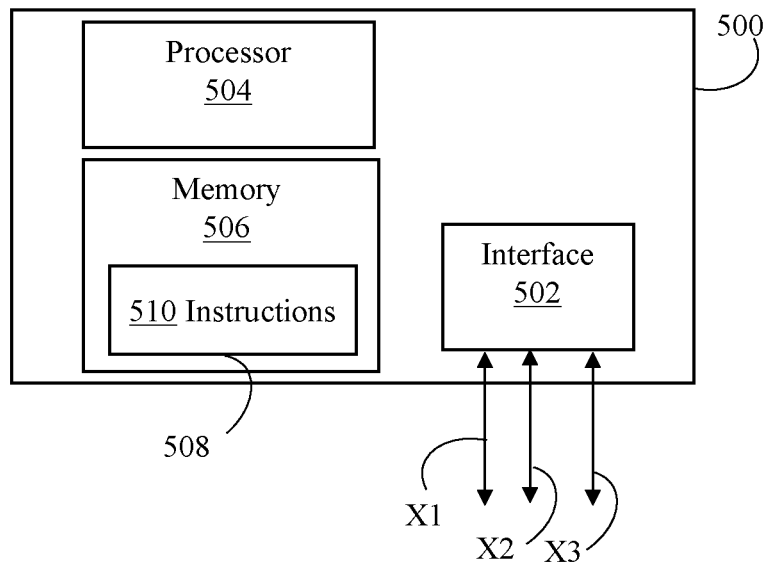

Referring to FIGS. 6 to 8, an embodiment provides a communication device 500 comprising interface circuitry 502, a processor 504 and memory 506. The interface circuitry is configured to receive requests and/or send responses between the communication device 500 and a NE (or a communication device 400 which hosts the NE).

The memory comprises instructions 508 which when performed by the at least one processor 504 cause the communication device to perform lawful interception, LI, administrative function, ADMF, operations of:
receiving a message 610 from the network element, NE;
obtaining from the message a current Issue count of Issues reported from the NE to the LI ADMF;
comparing the current Issue count of Issues reported from the NE to the LI ADMF with a current Issue count of Issues received at the LI ADMF from the NE;
determining based on the comparing that there is at least one Report Issue request message sent by the NE and not received by the LI ADMF;
sending a request message 620 to the NE requesting information about at least one Issue reported in the at least one Report Issue request message;
receiving from the NE a response message 622 including the information about the at least one Issue reported in the at least one Report Issue request message; and
incrementing the current Issue count of Issues received at the LI ADMF from the NE based on the information in the response message.

In other words, the instructions may be a LI ADMF software hosted by the communication device 500, the LI ADMF software configured to perform one or more of the methods and embodiments described herein.

In an embodiment, the interface circuitry is configured to receive requests and/or send responses over an interface, X1, in accordance with the ETSI TS 103 221-1 standard for the LI X1 interface.

In embodiment, the instructions further implement a Counter, the ADMFCounterIssue, configured to store the current Issue count of Issues received from the NE; the ADMFCounterIssue is incremented based on the information in the response message received from the NE.

Figure 9:
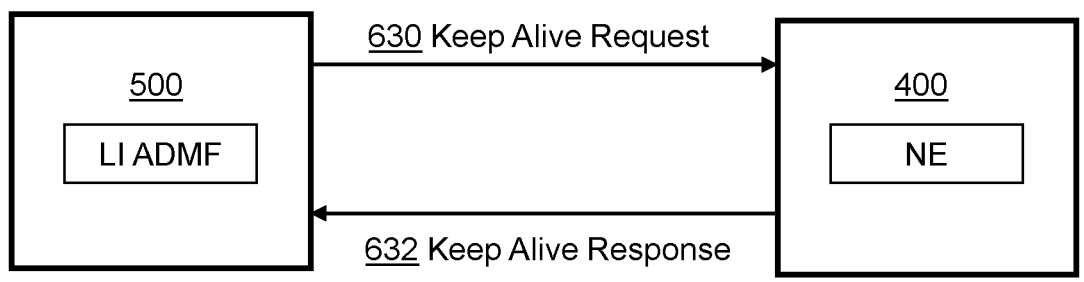

Referring to FIG. 9, in an embodiment, the memory comprises further instructions 508 which when performed by the at least one processor 504 cause the communication device to perform operations of:
sending a Keep Alive Request 630 to the NE, as described above with reference to FIG. 4; and
receiving a Keep Alive Response 632 from the NE, as described above with reference to FIG. 4 and Tables 43A and 43B.

In other words, in this embodiment, the message 610 received from the NE is a Keep Alive Response 632.

Figure 10:
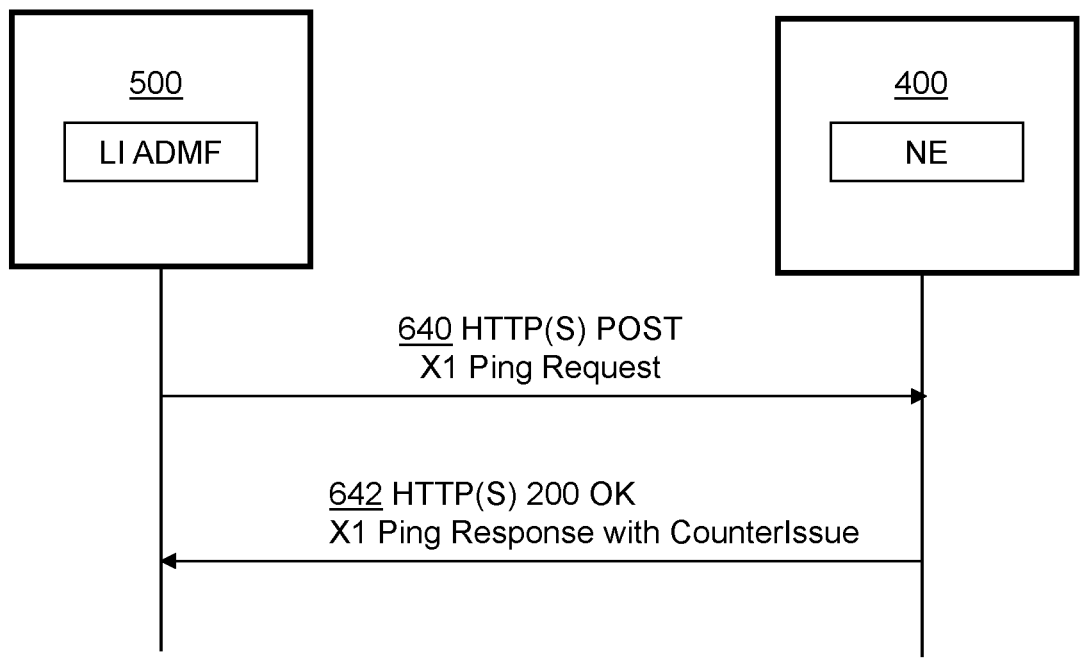

Referring to FIG. 10, in an embodiment, the memory comprises further instructions 508 which when performed by the at least one processor 504 cause the communication device to perform operations of:
sending a Ping Request 640 to the NE, as described above with reference to FIG. 4; and
receiving a Ping Response 642 from the NE, as described above with reference to FIG. 4 and Tables 41A and 41B.

In other words, in this embodiment, the message 610 received from the NE is a Ping Response 642; for example, an HPPT(S) 200 OK X1 Ping Response including a CounterIssue field, as illustrated in Tables 41A and 41B above.

Figure 11:
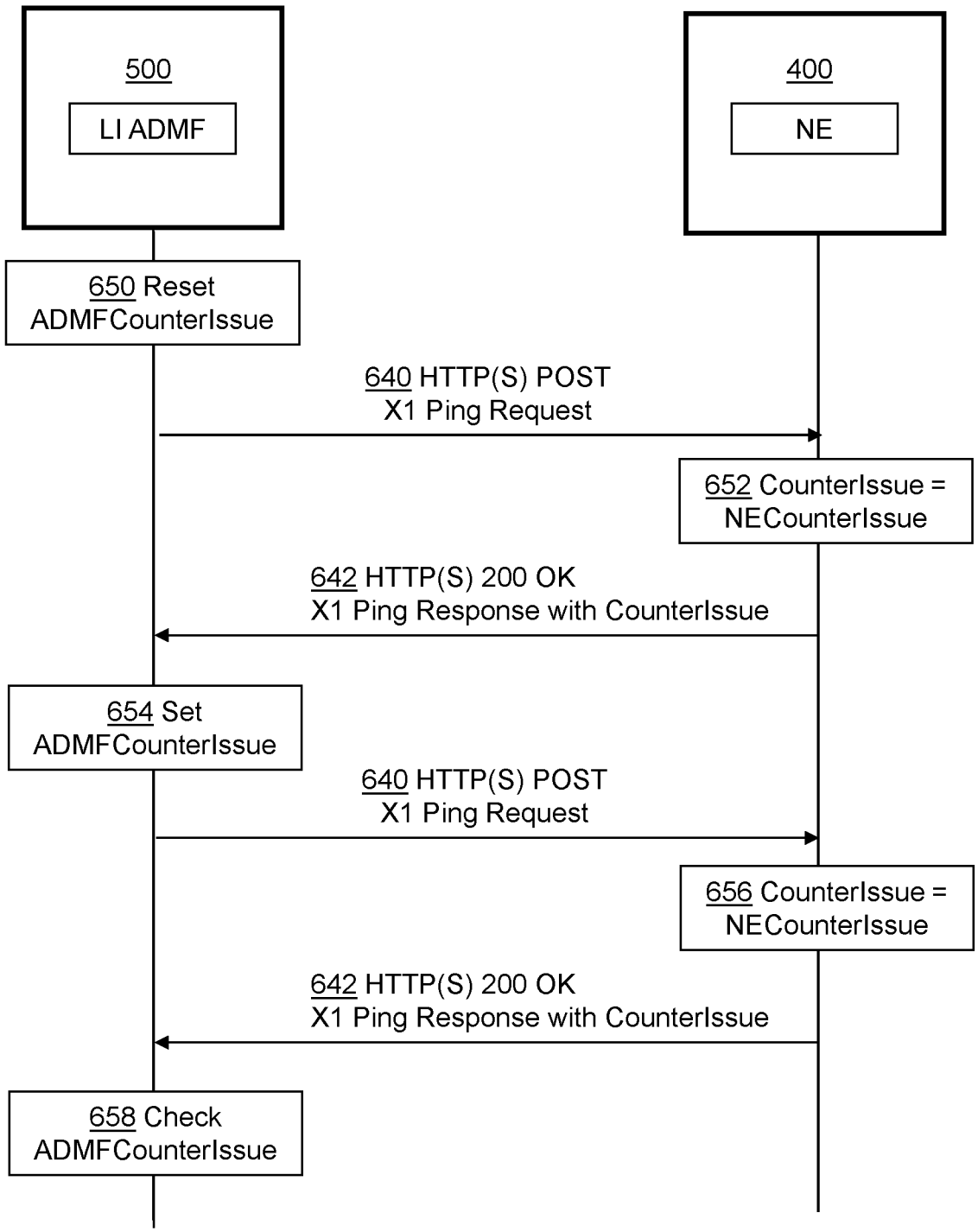

FIG. 11 illustrates an example exchange of Ping messages between the NE 400 and LI ADMF 500 when the LI ADMF is first connected to a NE.

When the LI ADMF is connected to the NE for the first time, the current Issue count of Issues received at the LI ADMF from the NE (the "ADMFCounterIssue") is reset 650 to an initial value.

When the LI ADMF sends a PingRequest 640 to the NE and the NE sends a PingResponse 652 back to the LI ADMF, the PingResponse including a CounterIssue field containing the current Issue count of Issues reported from the NE to the LI ADMF (the "NECounterIssue"), as illustrated in Table 41A above.

Following sending of a first PingRequest by the LI ADMF and receipt of a first PingResponse from the NE, containing the current NECounterIssue, the LI ADMF sets 654 the ADMFCounterIssue to a valid value, i.e. the ADMF is set to the current NECounterIssue.

A corresponding message exchange can also be performed with Keep Alive messages.

Ping (or KeepAlive) messages are sent periodically when a NE is connected to an LI ADMF. After the first reception, any time a PingResponse or a KeepAliveResponse is received containing a NECounterIssue, the LI ADMF checks 658 the received NECounterIssue against the ADMFCounterIssue. If values are the same, there are no Report Issue requests sent by the NE that have not been received by the LI ADMF. If the values are not the same, i.e. the ADMFCounterIssue is lower than the received NECounterIssue, the LI ADMF determines that one or more Report Issue requests sent by the NE have not been received at the LI ADMF. The LI ADMF then sends a request message 620 to the NE requesting information about one or more Issue/s reported by the NE and not received by the LI ADMF. The LI ADMF may send a GetAllDetails request to the NE, and the NE respond with a GetAllDetails response, as described above, or the LI ADMF may send a GetReportIssueRequest and the NE respond with a GetReportIssueResponse, as described above with reference to Tables 1 and 2.

Figure 12:
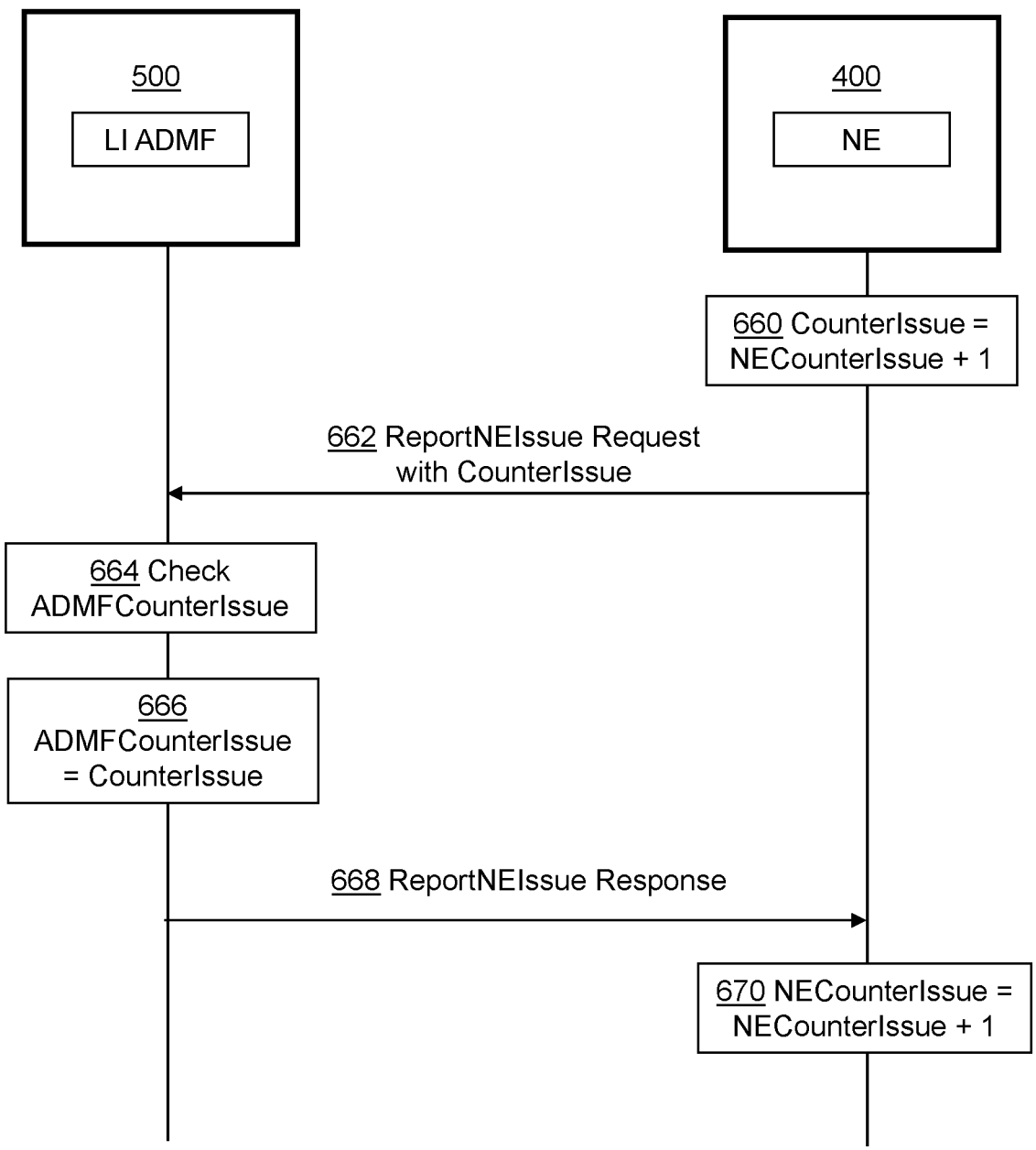

FIG. 12 illustrates an example exchange of Report Issue messages between the NE 400 and LI ADMF 500 when the NE has a new Issue to report.

The NE prepares a Report Issue request message for reporting the Issue, for example a ReportNEIssue request to report an NEIssue and increments 660 the NECounterIssue by 1. The incremented NECounterIssue is added to the ReportNEIssue request in the CounterIssue 10) field and the NE sends 662 the ReportNEIssue request to the LI ADMF.

The LI ADMF checks 664 the received CounterIssue against the current ADMFCounterIssue. If the received CounterIssue is only one greater than the current ADMFCounterIssue, no ReportIssue requests sent by the NE have not been received at the LI ADMF. The LI ADMF then sets 666 the ADMFCounterIssue to the received CounterIssue and sends 668 a ReportNEIssueResponse to the NE.

If the received CounterIssue is more than one greater than the current ADMFCounterIssue, an indicated number of ReportIssue requests have not been received by the LI ADMF and the LI ADMF must request information about one or more Issue/s reported by the NE and not received by the LI ADMF. The LI ADMF may send a GetAllDetails request to the NE, and the NE respond with a GetAllDetails response, as described above, or the LI ADMF may send a GetReportIssueRequest and the NE respond with a GetReportIssueResponse, as described above with reference to Tables 1 and 2.

The ADMF using the ReportIssue counter can know if one or more notification is lost from NE.

An embodiment provides a lawful interception system 600 in a telecommunication network, as illustrated in FIGS. 5 to 8. The system comprising a first communication device 400 hosting a NE and a second communication device hosting an LI ADMF, as described above.

Referring to FIG. 5, an embodiment provides a computer program 408 comprising instructions 410 which, when executed on a communication device 400, cause the communication device 400 to carry out the method 200 performed by a communication device hosting NE described above, with reference to FIG. 3.

Referring to FIG. 5, an embodiment provides the data carrier 406, for example memory having computer readable instructions embodied therein, the computer readable instructions for providing access to resources available on a communication device 400. The computer readable instructions comprising instructions to cause the communication device to perform the steps of the method 200 performed by a communication device hosting an NE described above, with reference to FIG. 3.

Referring to FIG. 6, an embodiment provides a computer program 508 comprising instructions 510 which, when executed on a communication device 500, cause the communication device 500 to carry out the method 300 performed by a communication device hosting an LI ADMF described above, with reference to FIG. 4.

Referring to FIG. 6, an embodiment provides a data carrier, for example memory, 506 having computer readable instructions embodied therein, the computer readable instructions for providing access to resources available on a communication device 500. The computer readable instructions comprising instructions to cause the communication device to perform the steps of the method 300 performed by a communication device hosting an LI ADMF described above, with reference to FIG. 4.

The invention claimed is:

1. A method performed by a communication device hosting a network element (NE), the method comprising:
preparing a Report Issue request message for reporting an Issue;
incrementing an Issue count to obtain a current Issue count of Issues reported by the NE to a lawful interception (LI) administrative function (ADMF), wherein the current Issue count also forms an identifier of the Issue;
adding the current Issue count to the Report Issue request message;
sending the Report Issue request message including the current Issue count to the LI ADMF;
receiving a request message from the LI ADMF requesting information about at least one Report Issue request message sent by the NE and not received by the LI ADMF, based on comparing the current Issue count of Issues reported from the NE to the LI ADMF with a current Issue count of Issues received at the LI ADMF from the NE and determining based on the comparing that there is at least one Report Issue request message sent by the NE and not received by the LI ADMF; and
sending a response message including the requested information.

2. The method of claim 1, wherein the Report Issue request message includes a CounterIssue field and the current Issue count is added in the CounterIssue field.

3. The method of claim 2, wherein the Report Issue request message is one of a ReportTaskIssueRequest, ReportNEIssueRequest or a ReportDestinationIssueRequest, wherein incrementing an Issue count comprises incrementing a respective one of a TaskIssue count, an NEIssue count or a DestinationIssue count, and wherein adding the current Issue count comprises adding a respective one of a current TaskIssue count, a current NEIssue count or a current DestinationIssue count to the respective CounterIssue field.

4. The method of claim 1, further comprising:
receiving from the LI ADMF one of a Ping request or a Keep Alive request; and
sending a respective one of a Ping response or a Keep Alive response to the LI ADMF, the respective Ping response or Keep Alive response including information indicative of a current Issue count of Issues reported by the NE to the LI ADMF.

5. The method of claim 4, wherein the respective one of a Ping response or a Keep Alive response includes at least one CounterIssue field and the information indicative of a current Issue count is added in the at least one CounterIssue field.

6. The method of claim 5, wherein the respective one of a Ping response or a Keep Alive response includes a CounterTaskIssue field, a CounterNEIssue field and a CounterDestinationIssue field, and wherein a current TaskIssue count, a current NEIssue count and a current DestinationIssue count are added in the respective said field.

7. The method of claim 1, wherein the request message is a GetAllDetails request and the response message is a GetAllDetails response.

8. The method of claim 1, wherein the request message includes at least one identifier identifying the at least one Issue reported in the at least one Report Issue message for which information is requested and the response message includes information about the at least one Issue identified by the at least one identifier.

9. A method performed by a communication device hosting a lawful interception (LI) administrative function (ADMF), the method comprising:
receiving a message from a network element (NE);
obtaining from the message a current Issue count of Issues reported from the NE to the LI ADMF, wherein the current Issue count also forms an identifier of the Issue;
comparing the current Issue count of Issues reported from the NE to the LI ADMF with a current Issue count of Issues received at the LI ADMF from the NE;
determining based on the comparing that there is at least one Report Issue request message sent by the NE and not received by the LI ADMF;
sending a request message to the NE requesting information about at least one Issue reported in the at least one Report Issue request message;
receiving from the NE a response message including the information about the at least one Issue reported in the at least one Report Issue request message; and
incrementing the current Issue count of Issues received at the LI ADMF from the NE based on the information in the response message.

10. The method of claim 9, wherein the message received from the NE is a Report Issue request including a CounterIssue field containing the current Issue count.

11. The method of claim 10, wherein the Report Issue request is one of a ReportTaskIssueRequest, ReportNEIssueRequest or a ReportDestinationIssueRequest, the respective CounterIssue field including a respective one of a current TaskIssue count, a current NEIssue count or a current DestinationIssue count.

12. The method of claim 9, further comprising sending one of a Ping request or a Keep Alive request to the NE and wherein the message received from the NE is a respective one of a Ping response or a Keep Alive response, the respective Ping response or Keep Alive response including information indicative of a current Issue count of Issues reported by the NE to the LI ADMF.

13. The method of claim 12, wherein the respective one of a Ping response or a Keep Alive request includes at least one CounterIssue field including the information indicative of a current Issue count of Issues reported by the NE to the LI ADMF.

14. The method of claim 12, wherein the respective one of a Ping response or a Keep Alive request includes a CounterTaskIssue field including a current TaskIssue count, a CounterNEIssue field including a current NEIssue count and a CounterDestinationIssue field including a current DestinationIssue count.

15. The method of claim 9, wherein the request message is a GetAllDetails request and the response message is a GetAllDetails response.

16. The method of claim 9, wherein the request message includes at least one identifier identifying the at least one Issue reported in the at least one Report Issue message for which information is requested and the response message includes information about the at least one Issue identified by the at least one identifier.

17. A communication device comprising interface circuitry, at least one processor and memory comprising instructions which when performed by the at least one processor cause the communication device to perform network element (NE) operations of:
preparing a Report Issue request message for reporting an Issue;
incrementing an Issue count to obtain a current Issue count of Issues reported by the NE to a lawful interception (LI) administrative function (ADMF), wherein the current Issue count also forms an identifier of the Issue;
adding the current Issue count to the Report Issue request message;
sending the Report Issue request message including the current Issue count to the LI ADMF;
receiving a request message from the ADMF requesting information about at least one Report Issue request message sent by the NE and not received by the LI ADMF, based on comparing the current Issue count of Issues reported from the NE to the LI ADMF with a current Issue count of Issues received at the LI ADMF from the NE and determining based on the comparing that there is at least one Report Issue request message sent by the NE and not received by the LI ADMF; and
sending a response message including the requested information.

18. A communication device comprising interface circuitry, at least one processor and memory comprising instructions which when performed by the at least one processor cause the communication device to perform lawful interception (LI) administrative function (ADMF) operations of:

receiving a message from the network element (NE);
obtaining from the message a current Issue count of Issues reported from the NE to the LI ADMF, wherein the current Issue count also forms an identifier of the Issue;
comparing the current Issue count of Issues reported from the NE to the LI ADMF with a current Issue count of Issues received at the LI ADMF from the NE;
determining based on the comparing that there is at least one Report Issue request message sent by the NE and not received by the LI ADMF;
sending a request message to the NE requesting information about at least one Issue reported in the at least one Report Issue request message;
receiving from the NE a response message including the information about the at least one Issue reported in the at least one Report Issue request message; and
incrementing the current Issue count of Issues received at the LI ADMF from the NE based on the information in the response message.

* * * * *